UNITED STATES PATENT OFFICE.

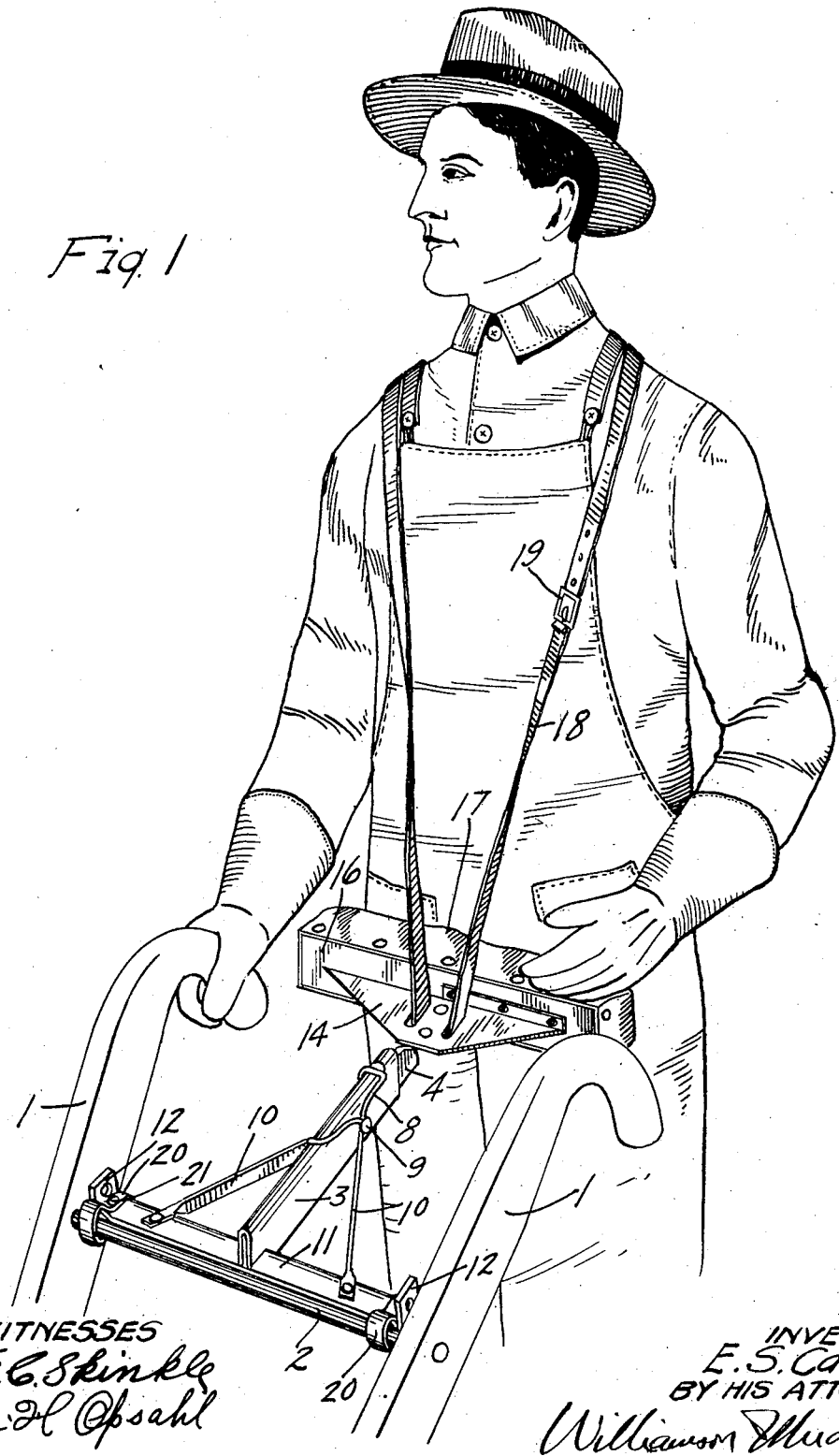

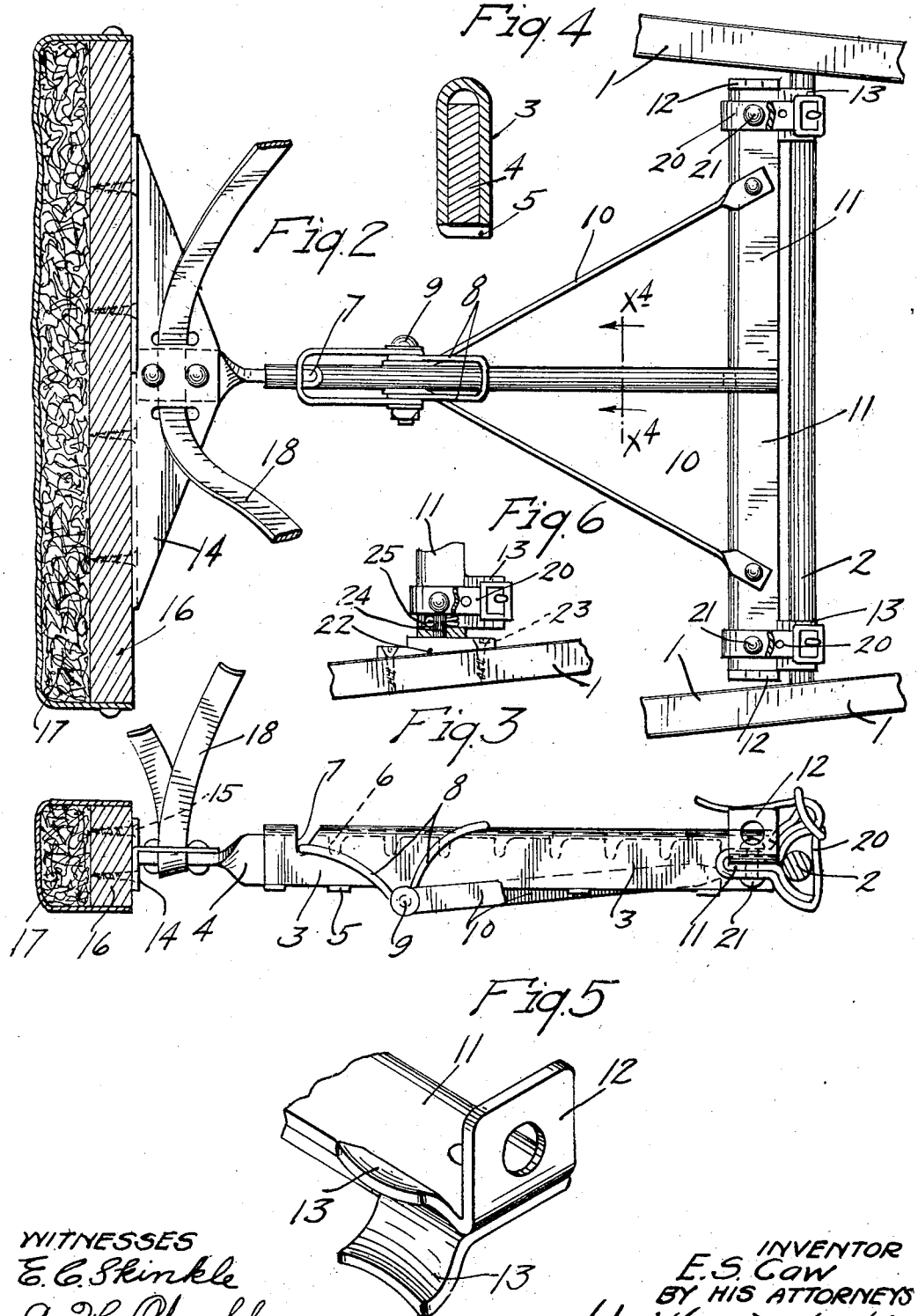

EDWARD S. CAW, OF MINNEAPOLIS, MINNESOTA.

PUSHING DEVICE FOR CULTIVATORS.

1,234,871.  Specification of Letters Patent.  Patented July 31, 1917.

Application filed December 7, 1915. Serial No. 65,447.

*To all whom it may concern:*

Be it known that I, EDWARD S. CAW, a citizen of the United States, residing at Minneapolis, in the county of Hennepin and State of Minnesota, have invented certain new and useful Improvements in Pushing Devices for Cultivators; and I do hereby declare the following to be a full, clear, and exact description of the invention, such as will enable others skilled in the art to which it appertains to make and use the same.

My invention has for its object to provide an extremely simple and highly efficient pushing device for hand operated wheel-hoes and other manually operated cultivating implements; and to such ends, generally stated, the invention consists of the novel devices and combinations of devices hereinafter described and defined in the claims.

The cultivating implements of the character above noted are provided with laterally spaced rearwardly projecting handle bars, the upper rear ends of which are adapted to be gripped by the hands of the operator, and, by pressure exerted through the arms and hands, the implement is customarily forced forward. Such implements are extensively used in truck gardening where shallow cultivation makes it possible to operate the implement manually; but even this class of work done in the usual way is tiresome, and in some conditions of the soil, nearly, or quite, impossible even with the small implement designed for the purpose.

It is a well known fact that a person leaning against an object with his body can exert a great deal more force than it is possible to transmit through forwardly extended arms and hands. With this fact in mind, I have contrived an extremely simple and highly efficient so-called pushing device for hand operated implements of the character above generally indicated.

In the accompanying drawings which illustrate the invention, like characters indicate like parts throughout the several views.

Referring to the drawings:

Figure 1 is a perspective view showing the handle bars of a manually operated wheel-hoe, or other form of light cultivator and illustrating the manner of applying and using my invention in connection therewith;

Fig. 2 is a view chiefly in plan but with some parts sectioned and some parts broken away, showing the pushing device connected to the handle bars of a cultivator;

Fig. 3 shows the parts illustrated in Fig. 2 partly in side elevation and partly in vertical section;

Fig. 4 is an enlarged section taken on the line $x^4$ $x^4$ of Fig. 2;

Fig. 5 is a fragmentary perspective showing one end of the head bar of a pushing device; and Fig. 6 is a fragmentary view partly in plan and partly in horizontal section illustrating a modified means of connecting the head bar of the pushing device to the handle bars of the cultivator.

The handle bars 1 of the cultivator are usually connected near their rear ends by a rung or tie rod 2 that affords a convenient part to which the pushing device may be attached.

The pushing device, as preferably constructed, comprises a longitudinal adjustable push bar, a head bar at the front end of the push bar, and a padded presser head against which latter the body of the operator is adapted to be pressed. The extensible push bar is made up of folded metal casings 3 and a flat bar 4 mounted to slide therein, the said casing having underbent lips 5 that hold the said bar 4 against edgewise displacement. The upper edge of the bar 4 has longitudinally spaced notches 6 while the upper edge of the casing 3 has a single notch 7. The numeral 8 indicates a loop-like spring that embraces the casing with one end bearing on the upper edge thereof, and the other end working in the notch 7 and engageable with one or the other of the notches 6 of the bar 4.

The intermediate portions of the sides of the spring 8 are bent around the ends of a bolt 9 that is passed through depending side portions of the casing and to which, as illustrated, the rear ends of brace bars 10 are also anchored by the said bolt. The front end of the casing 3 and the front end of the brace bars 10 are secured to a transversely extended so-called head bar 11 that is preferably formed with a folded metal sheet, and, at its ends, is formed with perforated upturned lugs 12 and forwardly projecting fork-forming flanges 13.

The rear end of the bar 4 is riveted, or otherwise rigidly secured to a metal flange 14 which, as shown, is rigidly, but detachably secured by screws 15, to a wooden bar 16 having a pad 17 attached to its rear face. A flexible hanger strap 18 is passed through perforations in the flange 14 and is provided with a buckle 19, by means of which it may be adjusted in length. To the ends of the head bar 11, in line with the forks made up of the flanges 13, buckle-equipped straps 20 are secured, by means of rivets 21.

When the device is to be used, the hanger strap 18 is thrown over the shoulders and adjusted so as to bring the padded presser head into position for engagement with the abdomen and thighs of the operator. Then, when the pushing device is to be used in connection with the cultivator having the tie rod 2, the forks made up of the flanges 13 are placed against the said rod 2 and are secured thereto by the buckle-equipped straps 20.

The push bar 3—4 should then be adjusted in length, so that the end piece of the handle bars 1 will be just at the right position for engagement with the hands of the operator. With the device thus applied and used, relatively great force is rendered available for pushing the plow or cultivator, and work that hitherto was tiresome and difficult, then becomes comparatively very light and easy work.

The padded head 16—17 is detachable from its anchoring flange 14, and from this it, of course, follows that interchangeably usable pads of different form or character may be employed when desired.

Some manually operated cultivators have handle bars that are not tied together near their ends by a cross rod; and in the application of this pushing device to such handle bars, I provide anchor plates 22 (see Fig. 6) secured to said bars by screws 23, and provided with laterally projecting studs 24 that are adapted to be passed through the perforated ears 12 of the head bar 11. As shown, split keys or cotters 25 are passed through the perforated ends of the studs 24.

What I claim is:

1. The combination with the rearwardly projecting handle bars of a manually operated cultivator, of a push device comprising a push bar anchored to said handle bars for common lateral movements therewith, but free for independent pivotal movements in respect thereto, said push bar at its rear end having a presser head for engagement with the body of the operator, and also having a device freely engageable over the shoulders of the operator to hold said presser head at the proper position.

2. The combination with the rearwardly projecting handle bars of a manually operated cultivator, of a push device comprising a push bar anchored to said handle bars for common lateral movements therewith, but free for independent pivotal movements in respect thereto, said push bar at its rear end having a presser head for engagement with the body of the operator, and also having a device freely engageable over the shoulders of the operator to hold said presser head at the proper position, the said push bar being made up of sections slidable one upon the other, one of said sections having ratchet teeth, and the other having a lock dog coöperating with said ratchet teeth.

In testimony whereof I affix my signature in presence of two witnesses.

EDWARD S. CAW.

Witnesses:
BERNICE G. WHEELER,
H. D. KILGORE.